(12) United States Patent
Bernhard

(10) Patent No.: US 10,606,220 B2
(45) Date of Patent: Mar. 31, 2020

(54) CLOSED-LOOP CONTROL DEVICE FOR CONTROLLING AT LEAST ONE CONTROL VALUE OF AT LEAST ONE TEMPERING CIRCLE

(71) Applicant: ENGEL AUSTRIA GmbH, Schwertberg (AT)

(72) Inventor: Hannes Bernhard, Engerwitzdorf (AT)

(73) Assignee: ENGEL AUSTRIA GMBH, Schwertberg (AT)

(*) Notice: Subject to any disclaimer, the term of this patent is extended or adjusted under 35 U.S.C. 154(b) by 0 days.

(21) Appl. No.: 15/611,126

(22) Filed: Jun. 1, 2017

(65) Prior Publication Data
US 2017/0351229 A1 Dec. 7, 2017

(30) Foreign Application Priority Data
Jun. 3, 2016 (AT) .................. 50511/2016

(51) Int. Cl.
*G05B 13/04* (2006.01)
*B29C 45/78* (2006.01)
*G05D 23/19* (2006.01)

(52) U.S. Cl.
CPC ............ *G05B 13/042* (2013.01); *B29C 45/78* (2013.01); *G05D 23/1917* (2013.01);
(Continued)

(58) Field of Classification Search
None
See application file for complete search history.

(56) References Cited

U.S. PATENT DOCUMENTS 4,453,116 A * 6/1984 Bose ................... H02P 21/08
318/727
5,158,062 A * 10/1992 Chen .................. F02D 41/1474
123/674
(Continued)

FOREIGN PATENT DOCUMENTS

CA 2783285 A1 * 1/2013 ................ F02C 9/28
DE 43 05 772 9/1994
(Continued)

OTHER PUBLICATIONS

Search Report dated May 31, 2017 in Austrian Application No. A 50511/2016, with English translation.
(Continued)

*Primary Examiner* — Thomas C Lee
*Assistant Examiner* — Charles Cai
(74) *Attorney, Agent, or Firm* — Wenderoth, Lind & Ponack, L.L.P.

(57) ABSTRACT

A closed-loop control device includes a target value entrance for inputting a target value for at least one control value, an actual value entrance for inputting an actual value for the at least one control value, wherein the actual value is determined based on the at least one measuring value, a calculation unit for calculating the actuation value based on a deviation of the actual value from the target value in such a way that the actual value follows the target value, and a control exit for outputting the actuation value for an actuator of the at least one tempering circle. The calculation unit is configured in such a way that the actuation value is calculated based on the present operating point or in a manner adapted to the present operating point.

3 Claims, 3 Drawing Sheets

(52) U.S. Cl.
CPC ............... *B29C 2945/7604* (2013.01); *B29C 2945/76304* (2013.01); *B29C 2945/76936* (2013.01)

(56) References Cited

U.S. PATENT DOCUMENTS

| | | | | |
|---|---|---|---|---|
| 5,323,748 | A * | 6/1994 | Foster | F02D 35/023 123/435 |
| 5,683,633 | A * | 11/1997 | Liehr | B29C 35/0288 264/328.16 |
| 5,720,912 | A * | 2/1998 | Liehr | B29C 45/7666 264/328.16 |
| 6,438,430 | B1 * | 8/2002 | Martin | G05B 13/042 700/28 |
| 6,464,603 | B1 * | 10/2002 | Reuschel | F16H 61/66254 474/28 |
| 6,701,193 | B1 * | 3/2004 | Filev | B05B 12/12 427/424 |
| 7,020,540 | B2 | 3/2006 | Linehan et al. | |
| 8,501,083 | B2 | 8/2013 | Nallen et al. | |
| 8,980,164 | B2 | 3/2015 | Nallen et al. | |
| 8,986,600 | B2 | 3/2015 | Nallen et al. | |
| 2004/0123850 | A1 * | 7/2004 | Baeuerle | F02D 23/00 123/564 |
| 2005/0256612 | A1 | 11/2005 | Linehan et al. | |
| 2006/0012064 | A1 * | 1/2006 | Hutson | B29C 45/768 264/40.1 |
| 2007/0181234 | A1 | 8/2007 | Nallen et al. | |
| 2007/0195853 | A1 * | 8/2007 | Park | C23C 16/46 374/1 |
| 2009/0319060 | A1 * | 12/2009 | Wojsznis | G05B 11/42 700/30 |
| 2010/0292811 | A1 * | 11/2010 | Schwarte | F02D 41/2451 700/29 |
| 2011/0269084 | A1 | 11/2011 | Ito | |
| 2013/0207620 | A1 * | 8/2013 | Li | H02J 3/1842 322/37 |
| 2013/0312875 | A1 | 11/2013 | Nallen et al. | |
| 2013/0312879 | A1 | 11/2013 | Nallen et al. | |
| 2016/0357166 | A1 * | 12/2016 | Rehor | G05B 19/042 |
| 2017/0274573 | A1 * | 9/2017 | Takii | B29C 45/62 |

FOREIGN PATENT DOCUMENTS

| | | | |
|---|---|---|---|
| DE | 44 36 126 | 3/1996 | |
| DE | 102004006162 B4 * | 1/2006 | ............ B29C 45/78 |
| KR | 1995-0010599 | 9/1995 | |
| KR | 10-2016-0041996 | 4/2016 | |
| WO | 2005/116791 | 12/2005 | |
| WO | 2016/084369 | 6/2016 | |

OTHER PUBLICATIONS

Samson AG: Technische Information: Regler and Regelstrecken. Frankfurt am Main, Jan. 2012 (L102) URL: https://www.samson.de/document/l102de.pdf with partial English translation.

* cited by examiner

CLOSED-LOOP CONTROL DEVICE FOR CONTROLLING AT LEAST ONE CONTROL VALUE OF AT LEAST ONE TEMPERING CIRCLE

BACKGROUND OF THE INVENTION

The invention concerns a closed-loop control device for controlling at least one control value of at least one tempering circle of a tool of a molding machine with the features of the preamble of claim 1 and/or with the features of the preamble of claim 7 and a tempering device with such a closed-loop control device and a method for controlling the tempering circle.

The at least one tempering circle comprises a feed conduit by means of which the tool to be tempered is fed with tempering medium with a determined feed temperature and with a determined flow rate. The tempering medium is lead away from the tool by means of a return conduit. The tempering circle is formed by the feed conduit, the tempering conduit in the tool and the return conduit and can be designed open or closed. The tempering circle additionally comprises yet at least one valve and a sensor for adjusting and monitoring the flow of the tempering medium in the tempering circle. The temperature of the tempering medium in the tool changes depending on a tool temperature to a return temperature. The temperature difference between the feed temperature and the tool temperature can be positive or negative. With an increasing volume flow, the absolute value of the temperature difference is sinking.

A generic closed-loop control device is disclosed in the DE 43 05 772 A1. This document describes that the temperature difference between the feed temperature and the return temperature or the return temperature can be used as control value. The flow rate of the tempering medium is used as the actuation value.

In the case of this control device the fact is problematical that depending on the currently present flow rate of the tempering medium a small change of the flow rate can lead to a very strong or weak change of the temperature difference. Put in other words, the control behavior (control quality), this means the transient response of the control value in the case of changes of the target value or in the case of disruptions, depends on the currently present operating point. If there is an operating point in the case of which a small change of the flow rate leads to a small change of the temperature difference, the closed-loop control device shows a slow transient response. If there is an operating point in the case of which a small change of the flow rate leads to a high change of the temperature difference, the closed-loop control device shows a fast transient response or can become unstable. This hampers a stable controlling of the at least one control value (here the return temperature or the temperature difference between the feed temperature and the return temperature).

In the case of known molding machines it was mostly necessary to newly parameterize the closed-loop control device as soon as a new tool was mounted or other changes concerning the tool were made or when target value changes or operating point changes have occurred.

SUMMARY OF THE INVENTION

The object of the invention is the provision of a generic closed-loop control device in the case of which a uniform and stable control behavior for different operating points and/or different tools is possible and a tempering device with such a closed-loop control device and a method for controlling the tempering circle.

This object is attained by a closed-loop control device with the features of claims 1 and/or claim 7 and by a tempering device with such a closed-loop control device and by a method according to claim 13. Advantageous embodiments of the invention are defined in the depending claims.

Because it is provided that the calculation unit is configured in such a way that the actuation value is calculated in dependence on the present operating point or in a manner adapted to the present operating point, the control behavior is not depending on the present operating point. The closed-loop control device shows a substantially identical control behavior also for different operating points.

This can be carried out in that the calculation unit is configured to calculate the actuation value in dependence on the present operating point by using a transformation rule between the actuation value and the control value or the measuring value, the transformation rule being stored in the closed-loop control device, wherein the transformation rule represents the interrelationship in dependence on the operating points of the at least one tempering circle, the operating points resulting from the different actuation values of the actuator. The interrelationship must be known at least to such an extent that the transformation rule can be generated. The determination of the interrelationship can be carried out analytically on the basis of physical theories, by means of computer simulations or empirically by measurements (or in any combination).

Alternatively, this can be carried out in that the calculation unit calculates the actuation value in a manner adapted to the present operating point by means of a parameterization adapted to the present operating point As it is additionally or alternatively provided that the calculation unit is configured to calculate the actuation value by using control parameters for controlling the molding process (injection molding process) and the calculation unit in dependence on a determined tempering parameter of the tempering circle converts the calculated actuation value by taking into account differences between a stored standard process and a molding process deviating from the standard process, a new parameterization can be omitted in the case of a change of process conditions or when a new tool is mounted.

Here it can be provided preferably that the tempering parameter is an energy parameter or a performance parameter derived therefrom, preferably a tempering performance, a heat transfer coefficient or a temperature difference between a feed temperature and a tool temperature. This tempering parameter can be determined during the process based on the actuation values and measuring values.

According to a preferred embodiment it can be provided that the differences between the standard process and the molding process deviating from the standard process are based on constructional differences between a tool mounted in the molding machine and a fictional tool underlying the standard process or are based on molding process technical differences between the standard process and the process deviating from the standard process. Constructional differences can be for example the size of the tool, the design of a cavity in the tool, the geometry of the tempering circle or the tubing. Molding process technical differences can be for example the change of the tool temperature, the change of the feed temperature, the change of the required heat amount, cycle time changes, and so on.

BRIEF DESCRIPTION OF THE DRAWINGS

Embodiments of the invention are discussed based on the drawings, in which.

DETAILED DESCRIPTION OF THE INVENTION

In general, the controlling of the at least on tempering circle can be carried out by means of a control value. Such a control value can be for example a temperature difference between a feed temperature and a return temperature, a flow rate of the tempering medium, a dissipated thermal capacity or thermal energy.

Hereinafter, the controlling by means of the temperature difference is described exemplarily.

The temperature difference delta T between the feed temperature $T_{feed}$ and the return temperature $T_{return}$ shall be controlled:

delta $T = T_{feed} - T_{return}$

Depending on the feed temperature $T_{feed}$ and the tool temperature positive or negative temperature differences delta T can appear. The absolute values of the temperature differences delta T each sink with the increasing flow rate $V_{soll}$ (compare FIG. 1).

When looking at the statistic behavior of the tempering circle, then the thermal flow $\dot{Q}$ from the tool into the tempering medium results depending on the heat transfer coefficient α, the effective surface A, the wall temperature $T_w$ and the medium temperature T∞.

$\dot{Q} = \alpha * A * (T_w - T_\infty)$

The thermal flow $\dot{Q}$ which is transported by the tempering medium corresponds to $\dot{Q} = \dot{m} * c_p *$ delta $T$, mit $\dot{m} = \rho * \dot{V}$ with the mass flow $\dot{m}$, the heat capacity $c_p$, the temperature difference delta T between the feed temperature $T_{feed}$ and the return temperature $T_{return}$, the density ρ and the flow rate (volume flow) $\dot{V}$.

Therefrom, it follows for the temperature difference:

$$deltaT = \frac{\alpha * A * (T_w - T_\infty)}{\rho * \dot{V} * c_p}$$

With the assumption of a constant heat transfer coefficient α it leads to the following simplified interrelationship:

$$deltaT = \frac{c_W * (T_w - T_\infty)}{\dot{V}}$$

The temperature difference delta T, thus, depends on the characteristics of the tempering circle and the tool $c_w$ respectively, from the temperature difference between the tool and the medium and from the flow rate.

Figure 1:
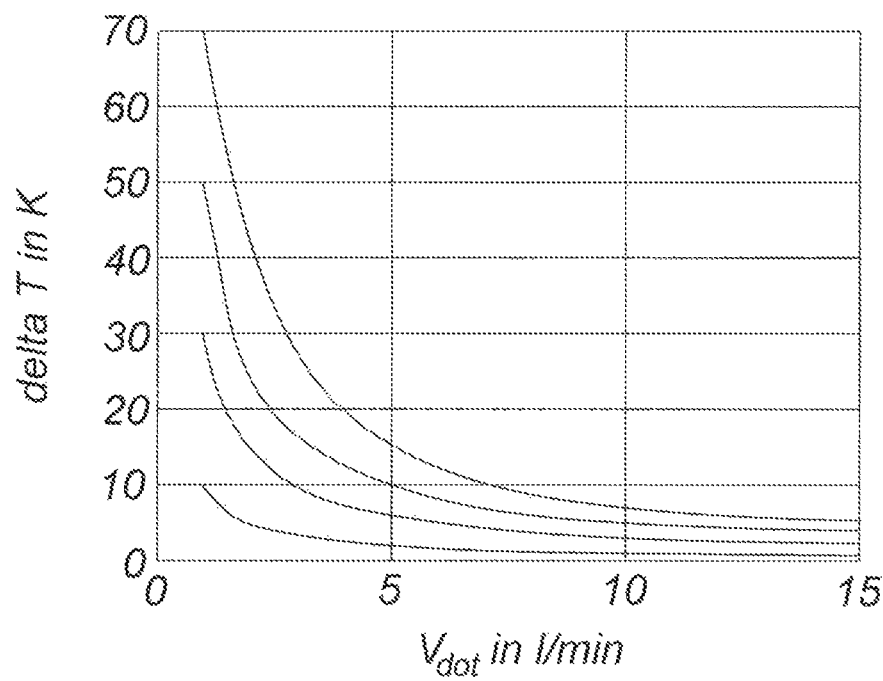
FIG. 1 shows a simplified model of the temperature difference depending on the volume flow when there are different tool temperatures.

FIG. 1 shows a simplified model of the temperature difference depending on the volume flow when there are different tool temperatures.

When summarizing all influences from tool and tempering medium, it leads simplified to the resulting behavior of a value $\dot{Q}^*(=deltaT*\dot{V})$ proportional to the heat flow $$deltaT = \frac{\dot{Q}^*}{\dot{V}}$$

Figure 2:
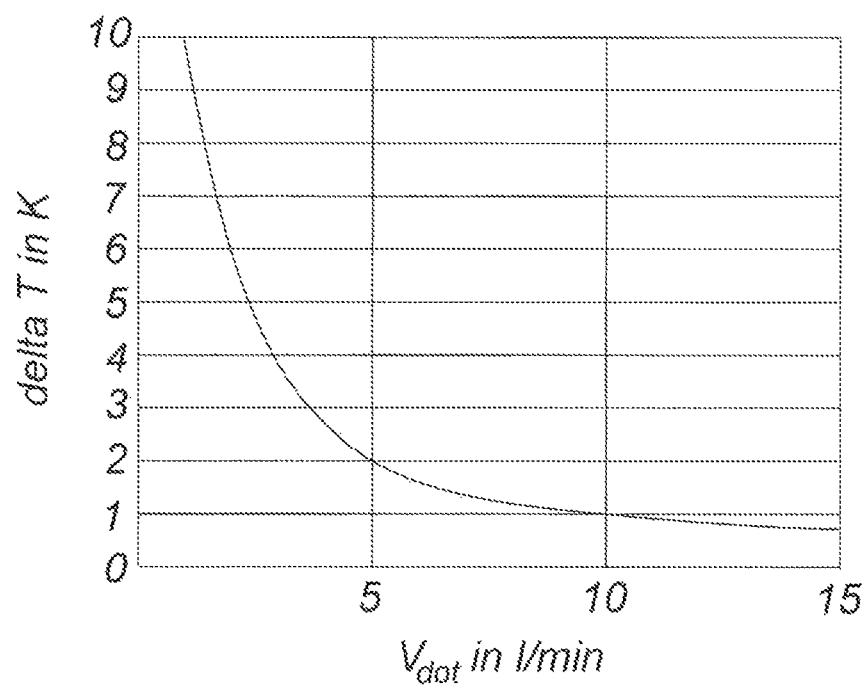
FIG. 2 shows a normalized characteristic curve with $\dot{Q}^*=10$ l/min K with a nonlinear behavior.

FIG. 2 shows a normalized characteristic curve with $\dot{Q}^*=10$ l/min K with a nonlinear behavior.

When viewing at the dynamic behavior of the tempering circle, so the change of the flow rate only has a delayed impact on the temperature difference because of the delay by the conduit. This leads to a transient response. Further, the heat transfer behavior changes in the case of a change of the flow rate corresponding to the wall temperature because of the heat transmission in the tool.

Hereinafter, the concept underlying the invention is further specified.

The physical interrelationship between the actuation value of the actuator (e. g. volume flow through a valve) and a measuring value of a sensor or a value derived therefrom (e. g. temperature difference delta T) of the tempering circle shows, as described above, a strong nonlinear behavior for different operating points. Further, the system behavior is highly depending on generally unknown values like tool temperature, heat transfer characteristics as well as medium temperature and medium conduits.

In order to avoid that the closed-loop control device has to be newly adjusted for each operating point, the invention provides that the calculation unit is configured in such a way that the actuation value is calculated in dependence on the present operating point or in a manner adapted to the present operating point.

Whether the tempering is carried out in form of a cooling or a heating depends of course therefrom whether the feed temperature is lower or higher than the tool temperature. For the controlling only the absolute value of the temperature difference is relevant.

The sampling time of the delta-T-controller can be significantly above the sampling time of the flow control so that a change of the flow rate is carried out already from one sampling step to the subsequent sampling step.

The determined actual value delta $T_{ist}$ of the control value can be defined as an average value over the cycle or over a correspondingly long time, as short-term dynamic deviations during the molding process (e. g. during an injection cycle of a molding machine formed as an injection molding machine) cannot be compensated anyway.

Figure 3:
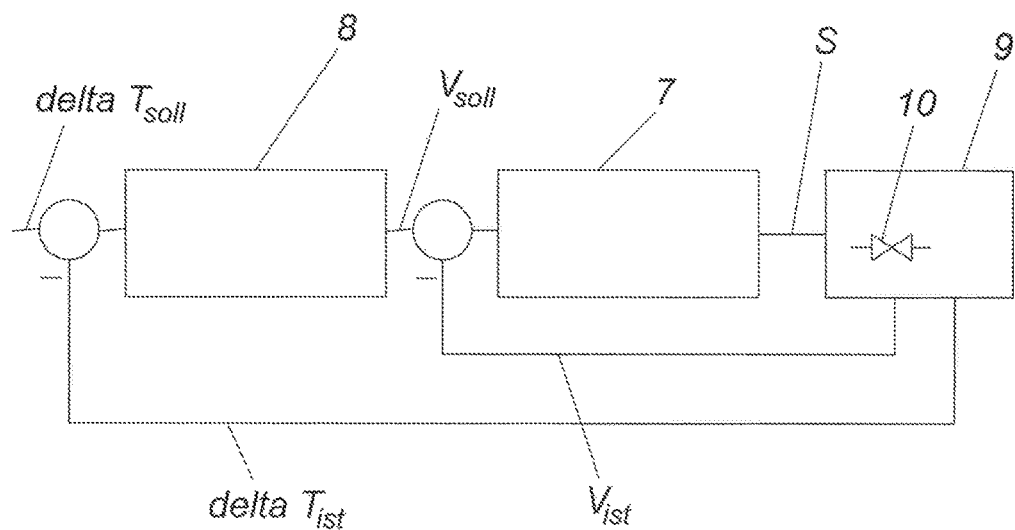
FIG. 3 shows a control structure corresponding to a cascaded control.

The control structure in FIG. 3 corresponds to a cascaded control. The flow rate control (calculation unit 7) represents the inner control loop. The (direct) actuation value S of the inner control loop, which actuation value S is transmitted to the actuator 10, for example a valve, serves for the adjustment of an actual flow value $V_{ist}$ in the considered tempering circle 9 (can also be designated as system). The temperature difference control is acting superimposed. The temperature difference control by means of the calculation unit 8 provides an actuation value $V_{soll}$ for the at least one control value (here temperature difference) which actuation value $V_{soll}$ is used as a target value for the inner control loop, whereby the value ($V_{soll}$) outputted by the calculation unit 8 finally represents an (indirect) actuation value for the actuator 10. This is shown in FIG. 3.

The delta-T-controller is based on a calculation unit 8 with a standard controller which is designed for example as a PID controller with the extensions described below.

Basically it shall be noted that the calculation unit 8 calculates the actuation value $V_{soll}$ in dependence on the present operating point by using a transformation rule between the actuation value $V_{soll}$ and the control value or the measuring value, the transformation rule being stored in the closed-loop control device, wherein the transformation rule represents the physical or empiric interrelationship in dependence on the operating points of the at least one tempering circle 9, the operating points resulting from the different actuation values $V_{soll}$ of the actuator 10.

In the following, the controlling is explained on the basis of a transformation rule, wherein the transformation rule shows a mathematical interrelationship between the actuation value $V_{soll}$ and the control value or the measuring value in form of an at least partial polynomial function of the n-th order, concretely in form of a linear polynomial function (n=1).

The highly nonlinear behavior is linearized in a defined range in order to reach a more uniform behavior for the controlling over a larger region of operating points.

A simplified model $$deltaT = \frac{\dot{Q}^*}{\dot{V}}$$

forms the basis with the nominal values $$\dot{Q}^*_{nom} = delta T_{nom} * \dot{V}_{nom}$$

Figure 4:
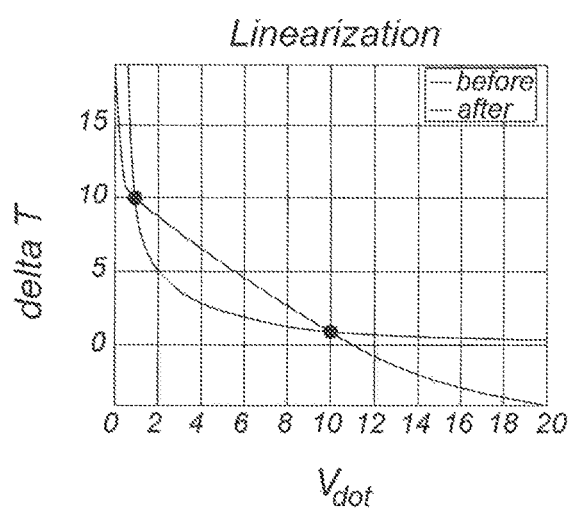
FIG. 4 shows a normalized characteristic curve in which nonlinear behavior in the range from the minimal to the maximal temperature difference is replaced by a linear behavior and is extrapolated correspondingly at the margins.

With this linearization the nonlinear behavior in the range from the minimal to the maximal temperature difference is replaced by a linear behavior and is extrapolated correspondingly at the margins (see FIG. 4). With this transformation rule the target value and the actual value of the temperature difference are converted at the entrance of the controller.

In the first step the inverse function of deltaT ($\dot{V}$), therefore $\dot{V}$(delta T) based on the nominal thermal flow $\dot{Q}^*_{nom}$ is calculated on the basis of this transformation rule.

In a second step the parameters of the linear function are determined based on two temperature values and the corresponding flow rates.

In the discussed embodiment it is additionally provided that the calculation unit 8 is configured to calculate the actuation value $V_{soll}$ by using control parameters for controlling the molding process and the calculation unit 8 in dependence on a determined tempering parameter of the tempering circle 9 converts the calculated actuation value $V_{soll}$ by taking into account differences between a stored standard process and a molding process deviating from the standard process Thereby, an adaptive control loop gain is reached. For example, the characteristic curve (delta T vs. $V_{dot}$), see FIG. 1, is shifted in dependence on the temperature difference from medium to tool as well as on the heat transfer characteristics in the tool. This dependency of the tempering parameters (shifting of the curve) in the case of different applications is compensated for the controlling.

Hereinafter, the thermal flow is concretely considered as the difference between the stored standard process and the molding process deviating from the standard process. By the measured temperature difference and the actual volume flow the actual thermal flow can be concluded.

By the comparison of the determined thermal flow $\dot{Q}^*_{act}$ with a nominal thermal flow $\dot{Q}_{nom}$ the correcting factor rAdaptiveGain can be determined according to the formula shown hereinafter. With this correcting factor the target values and the actual values are multiplied.

$$rAdaptiveGain = \frac{\dot{Q}_{nom}}{\dot{Q}^*_{act}}$$

The real system behavior is transformed or converted to the nominal system behavior by the multiplication. The closed-loop control device, thus, always sees the gain of the nominal system (stored standard process).

The benefit of this measure it that no controller parameterizations have to be carried out burdensome by a user when the tool is changed or when there are changes of molding process technical properties. Rather, the closed-loop control device autonomously considers the differences between the stored (nominal) standard process and the actually carried out molding process deviating from the standard process.

Figure 5:
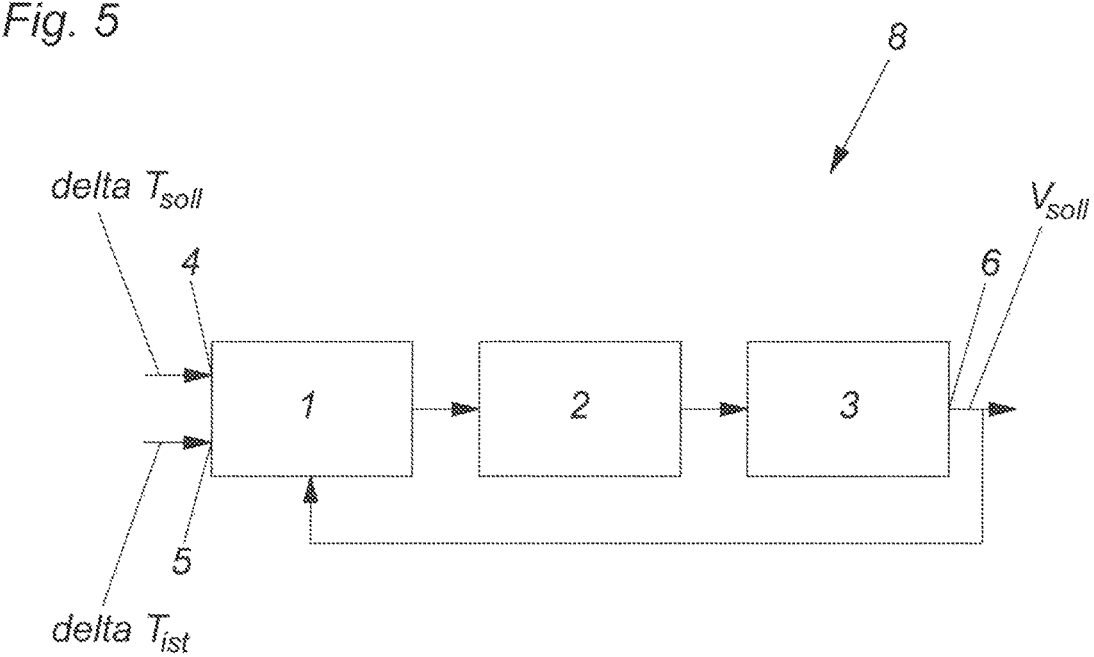
FIG. 5 is a schematic diagram showing the structure of the calculation unit of the closed-loop control device according to the invention.

FIG. 5 schematically shows the structure of the calculation unit (which is shown in FIG. 3 only as a block) of the closed-loop control device according to the invention, with the measures of claim 1 and claim 7. This calculation unit 8 comprises a module 1 for the adaptation of the differences between a stored standard process and a molding process deviating from the standard process, a module 2 for calculating the actuation value depending on the present operating point and as module 3 a standard controller.

By means of the shown actual value entrance 5 the temperature difference delta $T_{ist}$ is transmitted to the calculation unit 8. This temperature difference delta $T_{ist}$ is calculated from a measured feed temperature and a measured return temperature. By means of the shown target value entrance 4 a desired target value for the temperature difference is transmitted to the calculation unit 8. This target value can be set by a user via an operating device. The output of the actuation value $V_{soll}$ for the actuator 10 of the at least one tempering circle 9 via the control exit 6 is carried out by the calculation unit 8. In this particular case the actuator 10 is a valve of a flow rate controller 7 for the tempering circle 9.

A fixed parameterization is used in the state of the art. This means, the closed-loop control device (standard controller) is operated with one single set of parameters. This set has to be chosen for the worst-case application (high system gain and low dynamic). Thus, a very slow and sluggish controlling behavior is reached for the usual applications.

Here, the second embodiment of the invention starts, according to which the calculation unit is configured in such a way that the actuation value is calculated in dependence on the present operating point or in a manner adapted to the present operating point, preferably in that the calculation unit is calculating the actuation value in a manner adapted to the present operating point by means of a parameterization adapted to the present operating point.

Several sets of parameters for different operating points or process conditions of the molding process are stored. A robust data set is chosen by default. If necessary, the user can choose from predefined data sets based on specific system properties. However, an intervention of the user is necessary when there is a change of the operating point or of the process conditions. Preferably, however, it is provided that the selection of the data set is carried out without an intervention of the user based on parameters, actuation values or measuring values determined previous to or during the on-going operation.

The necessary parameters sets can be determined before the start of the actual controlling by corresponding tests or can be determined alternatively based on the mathematical interrelationship.

|  |  | flow rate | | | |
|---|---|---|---|---|---|
|  |  | $V_1$ | ... | ... | ... | $V_n$ |
| temperature difference | delta $T_1$ | $K_{11}$ | ... | ... | ... | $K_{1n}$ |
|  | ... | ... | ... | ... | ... | ... |
| ... | ... | ... | ... | ... | ... | ... |
|  | delta $T_m$ | $K_{m1}$ | ... | ... | ... | $K_{mn}$ |

Each record in the above shown table represents a specific operating point which is determined by a temperature difference delta $T_i$ and a flow rate $V_j$. A parameter set $K_{ij}$ is associated to each operating point. Of course, this association does not have to be in the form of a table, but can be in the form of any other mathematical association. Each parameter set $K_{ij}$ can be available in the form of an n-tuple (n greater/equal 1).

Depending on which operating point is present, the closed-loop control device—which is for example a PID controller—can now be parameterized with the corresponding parameter set. Of course it is also possible that in the case of the presence of an operating point which is not stored in the table, the control parameter is interpolated in dependence on the nearest operating point. In general, the operating point will indeed change during the operation, wherein then during the operation the chosen control parameter is changed or adapted to the control parameter which results from the changed situation.

LIST OF REFERENCE NUMERALS 1 module for the adaptation of differences
2 module for calculating the actuation value
3 module in form of a standard controller
4 target value entrance
5 actual value entrance
6 control exit
7 calculation unit (flow rate controller)
8 calculation unit
9 tempering circle
10 actuator
S actuation value of the calculation unit 7
$V_{soll}$ actuation value of the calculation unit 8 (corresponds to the target flow value for the calculation unit 7)
$V_{ist}$ actual flow value ($=V_{dot}$)
delta $T_{soll}$ target value
delta $T_{ist}$ actual value
K Parameter set

The invention claimed is:

1. An injection molding machine comprising:
a tempering device for a tool mounted in an the injection molding machine during a molding process, the tool comprising at least one tempering circle, wherein the at least one tempering circle comprises a feed conduit, a return conduit and tempering conduit in the tool; and
a closed-loop control device for controlling at least one control value of the at least one tempering circle for different operating points of the at least one tempering circle,
wherein the at least one tempering circle comprises an actuator and an interrelationship between an actuation value of the actuator and at least one measuring value, and the different operating points of the at least one tempering circle result in dependence on different actuation values of the actuator,
wherein closed-loop control device comprises:
a target value entrance for inputting a target value for the at least one control value;
an actual value entrance for inputting an actual value for the at least one control value, wherein the actual value is determined on the basis of the at least one measuring value;
a calculation unit for calculating the actuation value in dependence of a deviation of the actual value from the target value in such a way that the actual value follows the target value; and
a control exit for outputting the actuation value for the actuator of the at least one tempering circle,
wherein the calculation unit is configured to calculate the actuation value in dependence on the present operating point or in a manner adapted to the present operating point,
wherein the at least one control value is a difference between a feed temperature and a return temperature, a flow rate of the tempering medium, a dissipated thermal capacity or a dissipated thermal energy, and
wherein the calculation unit is configured to calculate the actuation value by using control parameters for controlling the molding process, and the calculation unit in dependence on a determined tempering parameter of the tempering circle converts the calculated actuation value by taking into account differences between a stored standard process and a molding process deviating from the standard process.

2. The injection molding machine according to claim 1, wherein the tempering parameter is an energy parameter or a performance parameter derived therefrom, preferably a tempering performance, a heat transfer coefficient or a temperature difference between a feed temperature and a tool temperature.

3. The injection molding machine according to claim 1, wherein the differences between the standard process and the molding process deviating from the standard process are based on constructional differences between a tool mounted in the molding machine and a fictional tool underlying the standard process or are based on molding process technical differences between the standard process and the process deviating from the standard process.

* * * * *